United States Patent [19]

Hirs

[11] Patent Number: 4,530,767
[45] Date of Patent: Jul. 23, 1985

[54] METHOD OF OIL COAGULATION UTILIZING ENTRAINED GAS

[76] Inventor: Gene Hirs, 8228 Goldie St., Walled Lake, Mich. 48088

[21] Appl. No.: 180,344

[22] Filed: Aug. 22, 1980

Related U.S. Application Data

[63] Continuation of Ser. No. 27,441, Apr. 5, 1979, abandoned.

[51] Int. Cl.³ .............................................. B01D 23/10
[52] U.S. Cl. .................... 210/708; 210/799; 210/DIG. 5; 210/807
[58] Field of Search ................ 210/634, 708, 792–799, 210/807, DIG. 5; 208/187

[56] References Cited

U.S. PATENT DOCUMENTS

| | | | |
|---|---|---|---|
| 3,471,401 | 10/1969 | Huval | 210/799 X |
| 3,794,583 | 2/1974 | Rhodes | 210/469 |
| 3,900,395 | 8/1975 | Hirs | 210/807 |
| 3,992,291 | 11/1976 | Hirs | 210/793 |
| 4,039,441 | 8/1977 | Fett | 210/799 X |
| 4,115,266 | 9/1978 | Ohshima | 210/786 |

Primary Examiner—David Sadowski
Attorney, Agent, or Firm—H. P. Settle

[57] ABSTRACT

The present invention proposes the utilization of a bed of finely divided, naturally occurring, strongly hydrophilic, strongly oleophobic materials for the coalescent removal of oil from water-oil mixtures containing appreciable amounts of entrained gas, such as crude oil. Preferably, the bed materials have a water wetting-to-oil wetting ratio greater than about three and are of a particle size ranging from about 20 mesh to about 60 mesh. Specifically utilized materials include fruit pit shells and nut shells such as apricot pit shells, peach pit shells, walnut shells and the like. The method consists of flowing a water-oil mixture containing entrained gas through a deep bed of fine particles and coalescing the oil internally of the bed into globules of a size incapable of passing through the interstices of the bed. The oil-free water effluent is recovered from the bed during coalescing of the oil and the oil is periodically recovered and removed from the bed by decanting or backwashing, the oil globules being readily released from the strongly oleophobic particles of the bed for flotation from the bed. Oil removal efficiencies in excess of 90% during a single passage through the bed are readily attained with the aid of the entrained gases, which materially increase the efficiency of oil-water separation, particularly in light oils or crude oil.

1 Claim, 2 Drawing Figures

METHOD OF OIL COAGULATION UTILIZING ENTRAINED GAS

This is a Continuation of application Ser. No. 027,441, filed April 5, 1979, abandoned.

BACKGROUND OF THE INVENTION

The removal of oil from admixture with water has posed a problem in many industries for many years. For example, an immediate problem exists in oil fields where water has to be separated from oil in order for the oil to be usable. This is particularly a vital problem where water or steam is injected into the well to aid in the oil extraction process. Also, previously known processes could not effectively separate light oils, such as kerosene, from admixture with water.

Attempts have been made to remove water from oil-water emulsions or mixtures by the utilization of sand filters. It has been discovered that sand filters fail after a short period of operation and the sand media has to be replaced, due to the building of "mud balls" or mixtures of dirt, oil and water in the sand. These mud balls do not float out or break-up during the normal backwash of the filters, and the sand cannot be reused. It has now been determined that sand, although normally considered a highly hydrophilic and highly oleophobic filter medium, does not reject entrapped oil from the sand surface to a sufficient extent to accommodate effective backwashing. There exists a need for a filter medium which can reject accumulated oil more easily and more completely than does sand.

In my earlier U.S. Pat. Nos. 3,780,861 and 3,992,291, I have proposed the specific utilization of a filter bed composed of granulated shells of black walnuts (Juglans Nigra L.) as a filter medium for removing solid contaminents or oil from liquids.

As disclosed in my earlier patents, the filter bed preferably was cleaned by violently and turbulently backwashing over a perforated element with at least a portion of the contaminents being withdrawn through the perforated element as the filter medium together with the contaminents were flowed thereover, all as described in my earlier U.S. Pat. No. 3,550,774. For use in such cleaning processes, the particles must be on the order of 20-30 mesh to avoid clogging or by-passing of the perforate element.

BRIEF DESCRIPTION OF THE INVENTION

It has been found that water-oil mixtures or emulsions containing appreciable amounts of entrained gas can be separated by coalescing the oil in a filter bed of appreciable depth and composed of finely divided granular materials which are more highly oleophobic than sand. It has been found specifically that fruit pit shells and nut shells alone or in a mixture are more strongly hydrophilic and oleophobic than sand and, thus, make possible the separation of such water-oil gas containing mixtures on a continuous, renewable basis. Coaslescing beds comprising such materials are readily cleansed of the oil entrapped in the interstices of the bed by simple backwashing and/or decanting techniques, because the highly oleophobic materials readily reject the oil upon backwashing. It has been found that the presence of the entrained gases in the oil-water mixture facilitates the separation of the mixture components.

The present invention thus proposes the removal of oil from water-oil mixtures containing appreciable amounts of entrained gases by flowing the mixture through a deep bed of highly hydrophilic and highly oleophobic materials with the oil being coalesced or agglomerated interiorly of the bed into aggregated or agglomerated globules of a size such that they cannot pass through the bed, and then removing the oil from the bed by decanting, preferably following backwashing.

AS SHOWN ON THE DRAWINGS

FIG. 1 is a vertical sectional view, schematic in nature, of an apparatus of the present invention; and FIG. 2 is a view similar to FIG. 1 of a different apparatus of the present invention.

DETAILED DESCRIPTION OF THE INVENTION

Figure 1:
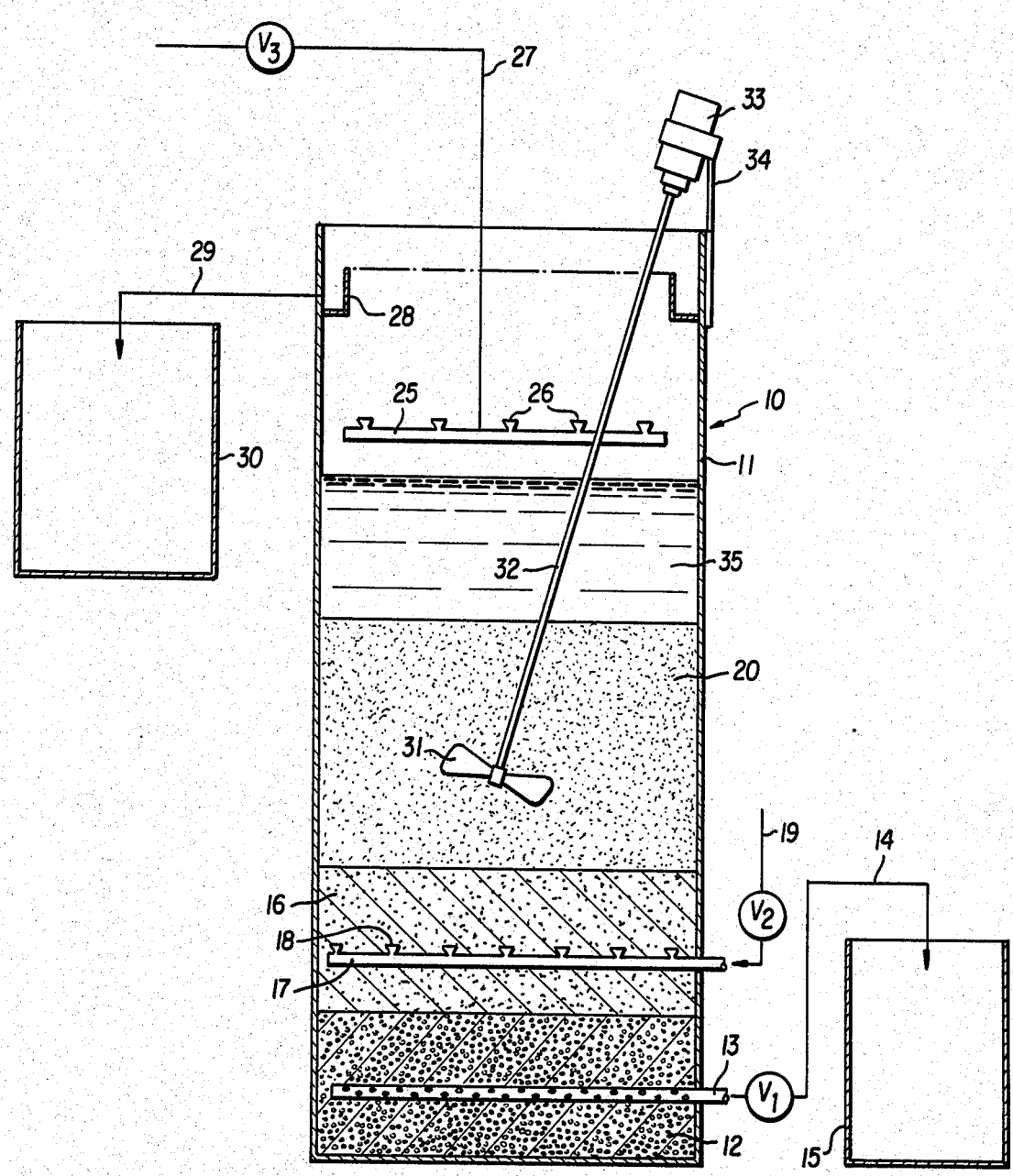

It has been found that effective separation of water-oil mixtures containing appreciable amounts of entrained gases can be obtained by flowing the mixture through a deep bed filter in which the bed is of appreciable depth, generally in excess of about 12 inches, the bed consisting essentially of individual media particles which are highly hydrophilic and highly oleophobic. Exemplary media materials having the requisite strength and abrasion resistance when finely divided include fruit pit shells, such as apricot pit shells, peach pit shells and the like, and nut shells such as English walnut shells, black walnut shells, pecan shells, almond shells, coconut shells and the like. The materials can be used in mixtures with one another, if desired.

When compared to sand, the materials are far less retentive of oil and far more retentive of water. The relative water and oil retention values are expressed herein in terms of a "water wetting-to-oil wetting ratio." To determine this ratio, the finely divided material is weighed, then surface wetted with water, and weighed again. The material is then dried, weighed again, surface wetted with oil, and then weighed a fourth time. The water wetting-to-oil wetting ratio is determined by the following formula:

$$\frac{\text{Surface Water in Grams}}{\text{Grams of Media}} \div \frac{\text{Surface Oil in Grams}}{\text{Grams of Media}}$$

From actual tests, the following results were obtained:

TABLE I

| Media | Water Grams/Grams Media | Oil Grams/Grams Media | Ratio W/O |
|---|---|---|---|
| Sand | .162 | .073 | 2.2 |
| Black Walnut Shells | .326 | .085 | 3.8 |
| English Walnut Shells | .357 | .090 | 4.0 |
| Apricot Pit Shells | .344 | .091 | 3.8 |

It will be seen that uniformly the water wetting-to-oil wetting ratio of the nut shells and fruit pit shells is greater than that for sand and, for such shells, the ratio exceeds three. This means that the naturally occurring materials of the present invention each has a greater preference for water and a less preference for oil than does sand. Such shells, in the presence of both oil and water, will be wet by the water rather than by the oil.

To demonstrate the effect of air upon the oil removal efficiency of the naturally occurring fruit pit shells and nut shells of the present invention, oil and water mixtures containing 150 parts per million oil of two types were flowed through an 18 inch deep bed of apricot pit shells, and the concentration of the oil in the effluent water was measured. The flow rate was eight gallons per minute per square foot of exposed upper area of the bed, the shells ranged in particle size from 20 to 50 mesh. The first runs were made without any preparation of the mixture other than uniformly mixing the oil in the water. Additional runs were made with each type of oil wherein the oil-water mixtures were violently whipped in a blender in the open air to entrain appreciable amount of air into the mixture. The test results were as follows from Tables II and III:

TABLE II

| | 100 S.S.U. OIL | | | |
|---|---|---|---|---|
| | Without Air | | With Air | |
| Gallons Filtered | Effluent PPM Oil | Oil Removal Efficiency | Effluent PPM Oil | Oil Removal Efficiency |
| 50 | 9.2 | 93.9% | 9.2 | 93.9% |
| 100 | 8.7 | 94.2% | 8.6 | 94.5% |
| 250 | 7.4 | 95.1% | 7.4 | 95.1% |
| 500 | 5.3 | 96.5% | 5.0 | 96.7% |
| 750 | 6.0 | 96.0% | 5.5 | 96.5% |
| 1000 | 6.4 | 95.7% | 5.4 | 96.6% |
| 1500 | 7.8 | 94.8% | 5.1 | 96.7% |

TABLE III

| | KEROSENE | | | |
|---|---|---|---|---|
| | Without Air | | With Air | |
| Gallons Filtered | Effluent PPM Oil | Oil Removal Efficiency | Effluent PPM Oil | Oil Removal Efficiency |
| 50 | 45 | 70.0% | 15 | 90.0% |
| 100 | 38 | 74.5% | 12 | 92.5% |
| 250 | 36 | 75.7% | 12 | 92.5% |
| 500 | 37 | 75.5% | 12 | 92.5% |
| 750 | 34 | 78.0% | 11 | 93.0% |
| 1000 | 37 | 75.5% | 13 | 91.0% |
| 1500 | 40 | 73.5% | 14 | 90.5% |

The gaseous component of the oil-water-gas mixture is entrained in the oil component or the water component or both. The gas can be introduced specifically to aid in coalescence as shown in Tables II or III, or the gas may naturally occur in the mixture, as in the case of crude petroleum or oil containing water and gases, such as hydrogen sulfide, methane, carbon disulfide, or the like, as the mixture is extracted from the earth.

The gas can either be physically entrapped in the other mixture components or dissolved in either or both of the other components. For example, air can be entrapped into the mixture simply by spraying the oil-water mixture into the ambient atmosphere or, alternatively, the air or other gas can be dissolved into the other components by injection under pressure. The term entrained gas, as herein utilized, is intended to cover both entrapped and dissolved gases, either added or naturally occurring.

The naturally occurring filter media of the present invention is preferably very fine, on the order of 20 to 60 mesh. In use, one or more of these finely divided, highly hydrophilic, highly oleophobic, naturally occurring nut shell or fruit pit shell materials are formed into a deep bed filter interiorly of a pressure vessel of known design. Of course, the depth of the bed is dependent upon the filtration pressure and generally is twelve inches or more in depth. The water-oil mixture is flowed in a first direction through the bed, preferably downwardly.

Although it is not certain how the bed of the present invention operates, the highly hydrophilic media particles are preferentially wetted with water in the above defined ratio of at least 3-to-1. It appears that the oil is repelled from the water-wetted surfaces and, thus, does not adhere to the media. The finely divided media forms a myriad of interstices through which the mixture must flow during its passage through the bed. Since the bed is of appreciable depth, generally in excess of one foot, each globule of oil in the mixture is subjected to innumerable contacts with other oil globules during its passage through the bed. Statistically, each individual oil globule will be brought into contact with many other such globules many times throughout the depth of the bed, and such contact causes the coalescence of the oil into larger globules. These larger globules merge and coalesce, in turn, with one another on contact to form progressively larger globules which increase in size until they can no longer pass through the interstices of the bed.

After appreciable flow of the mixture has occurred, the pressure drop across the bed will increase as the bed becomes clogged or internally "blinded off" by agglomerated or coalesced large oil globules filling the interstices of the bed. When the pressure drop increases beyond a predetermined desired value, the oil is removed by floatation from the bed. The influx of the mixture is halted, the system becomes quiescent, and the oil, which is lighter than the water of the bed particles, floats to the top of the bed. The oil can then be removed by decanting from the surface, with the level of the oil being elevated by the introduction of additional liquid; if desired. To aid in floatation of the oil from the bed, the bed may be agitated.

Alternatively, the bed may be backwashed by introducing a countercurrent flow of water, i.e. a flow through the bed in the direction opposite to the initial filtration flow of the mixture. Also, the bed preferably is agitated during backwash. The cleansing flow of water expands and agitates the bed, and the hydraulic shear forces of the water will aid in freeing the bed of the coalesced oil globules. Due to the highly oleophobic character of the bed materials, the oil will be readily released from the bed granules and will flow to the top of the container for later removal or may be carried out of the container in the backwash liquid. Since the particles have a specific gravity ranging from about 1.3 to 1.5, the bed particles readily separate gravitationally from the agglomerated oil globules and will not be carried out of the container, so that separation of the oil from the bed particles will be readily obtained. If desired, the bed may also be agitated mechanically or by the introduction of air or other gas under pressure to aid in the expansion of the bed and the release of the oil globules. Further, backwashing may be repeated several times if necessary to effect complete oil removal.

After backwashing has been accomplished, the flow of backwash liquid is terminated, the bed is allowed to settle to its original position within the filtration vessel, the oil on top of the backwash water is withdrawn, and the flow of the water-oil mixture into the vessel is reinitiated to start the filtration cycle again.

As shown on the drawings, FIG. 1 illustrates one form of apparatus of the present invention capable of carrying out the method of the present invention.

Essentially, the apparatus 10 comprises an open topped tank 11 containing, from the bottom, a first layer of uniformly sized gravel 12 within which is embedded an effluent drain 13 which is perforate and which communicates through a valve V-1 with a clean water conduit 14 discharging into a clean water tank 15.

Superimposed on the layer 12 of gravel is a layer 16 of sand having embedded therein a backwash header 17 having a plurality of upwardly directed nozzles 18. The backwash header 17 receives backwash liquid, such as clean water, from a backwash liquid conduit 19 having a valve V-2 therein.

Superimposed on the layer 16 of sand is a bed 20 of filter media composed of fruit pit shells or nut shells, as hereinbefore described. This bed 20 is of appreciable depth, at least 12 inches, preferably 18 inches or more. It will be noted that the superimposed or stacked layers 12, 16 and the bed 20 are of a combined depth substantially less than the vertical extent of the tank 11, for a purpose hereinafter to be more fully described.

Located over the bed 20 and in spaced relation thereto is an inlet header 25 having upwardly directed spray nozzles 26 and communicating with an inlet conduit 27 which is connected to a source of oil-water mixture to be separated by operation of the apparatus 10. A valve V-3 is interposed in the line 27 to control the flow of incoming liquid through the conduit. An upwardly opening decanting trough 28 is located in the tank 11 adjacent to top of the tank, substantially above the upper level of the bed 20 and above the inlet header 25. This trough communicates with an oil removal line 29 for carrying oil from the trough 28 to an oil receptacle 30. Embedded within the bed 20 is a propeller or agitator 31 having its drive shaft 32 projecting upwardly from the bed to an actuatable drive motor 33 mounted, as by bracket 34, on the tank 11 at the upper extremity thereof.

In the operation of the apparatus of FIG. 1 to carry out the method of the present invention, the layers 12, 16 and 20 are constituted and located as shown in FIG. 1, the valve V-3 is opened to introduce the oil and water mixture to be separated, and the valve V-1 is opened to accommodate the flow of effluent water through the drain 13 and the line 14 to the clean water receptacle 15.

The oil and water mixture entering the line 27 is sprayed into the ambient atmosphere through the upwardly directed nozzles 26, this spray entraining air into the mixture, with the spray gravitationally falling into the pool 35 overlying the bed 20. This pool 25 thus comprises a mixture of water and oil having air entrained therein.

Although not specifically shown in the drawings, other methods of entrainment of air or other gases may be utilized. For example, air, nitrogen, or other gas can be injected under pressure into the liquid prior to its introduction into the conduit 27, or the top of the tank 11 could be closed and air or other gas under pressure introduced into the tank over the level of the pool 35 to increase the efficiency of gas entrainment into the mixture sprayed from the nozzles 26. Other means of agitating the oil-water mixture in the presence of air or other gas to entrain appreciable amounts of gas into the mixture can be employed.

As shown in FIG. 1, the oil and water mixture with the gas entrained therein flows downwardly through the bed 20 which is composed of a myriad of finely divided media particles of fruit pit shells or nut shells as hereinbefore described, and the oil coalsceses within the interstices of the bed, also as hereinbefore described. As the coalsecence proceeds, the bed 20 becomes clogged with coalesced oil globules, and the pressure drop across the bed increases. This increase in pressure drop may be measured by an increase in the height of the pool 35, by the decreased flow of clean water through the line 14, or by any other means. After the pressure drop has reached a predetermined maximum, it is necessary to reconstitute the bed, and this can be accomplished in several different ways.

The simplest way of reconstituting the bed is to simply close the valve V-3, thereby stopping the introduction of oil and gas mixture through the header 25 and the nozzles 26, while also closing the valve V-1 to stop the flow of effluent. Next, the motor 33 is started to drive the agitator 31, thus mixing the bed 20 with the pool of liquid 35 over the bed. The bed 20 is thereby expanded and agitated so that the oil globules are readily released from the bed. The oil, being lighter than both the bed constituents and the water, rises to the top of the expanded bed. Next, the agitator motor 33 is shut off, and the bed 20 is allowed to settle back to its position upon the lower sand bed 16. Due to the substantial differences in density between the particles of the bed 20 and the sand of the lower layer 16, there is very little intermixing of the two beds, and the bed 20 readily reconstitutes itself.

At this state, the pool 35 now comprises a layer of oil at the surface from the bed 20 overlying the oil and water mixture which formed the original pool 35. Now the valve V-2 is opened and backwash fluid, preferably clean water, is introduced through the line 19 and the backwash header 17 to raise the level of the pool 35 to the level of the skimmer trough 28. The oil at the upper surface of the pool 35 simply flows into the trough 28 and exits through the line 29 into the oil receptacle 30. The introduction of liquid through line 19 is continued until the level of the pool 35 has been elevated so that all or most of the oil on the surface has overflowed the edge of the trough and then collected in the receptacle 30. After this has occurred, the valve V-1 is reopened and the level of liquid in the receptacle 11 drops to the normal illustrated level of the pool 35 by the downward flow of liquid through the bed 20, the sand layer 16 and the gravel layer 12. When a desired level of the pool 35 is reestablished, the valve V-3 is opened and normal separating action of the apparatus 10 is reinitiated.

If a more vigorous scrubbing action is required or desired during operation of the agitator 31 and the initial expansion of the bed 20, the valve V-2 is opened during the period of agitation, and expansion backwash liquid is introduced through the spray nozzles 18. After the period of agitation and expansion of the bed 20 is completed, the valve V-2 is closed to allow the pool to become quiescent and the oil to flow to the surface thereof as before, although the level of the pool 30 will be higher than that illustrated in FIG. 1 due to the introduction of the additional backwash liquid. After gravitational separation of the oil has occurred, the valve V-2 is reopened and the liquid level is raised to decant the oil through the trough 28, as earlier described.

Figure 2:
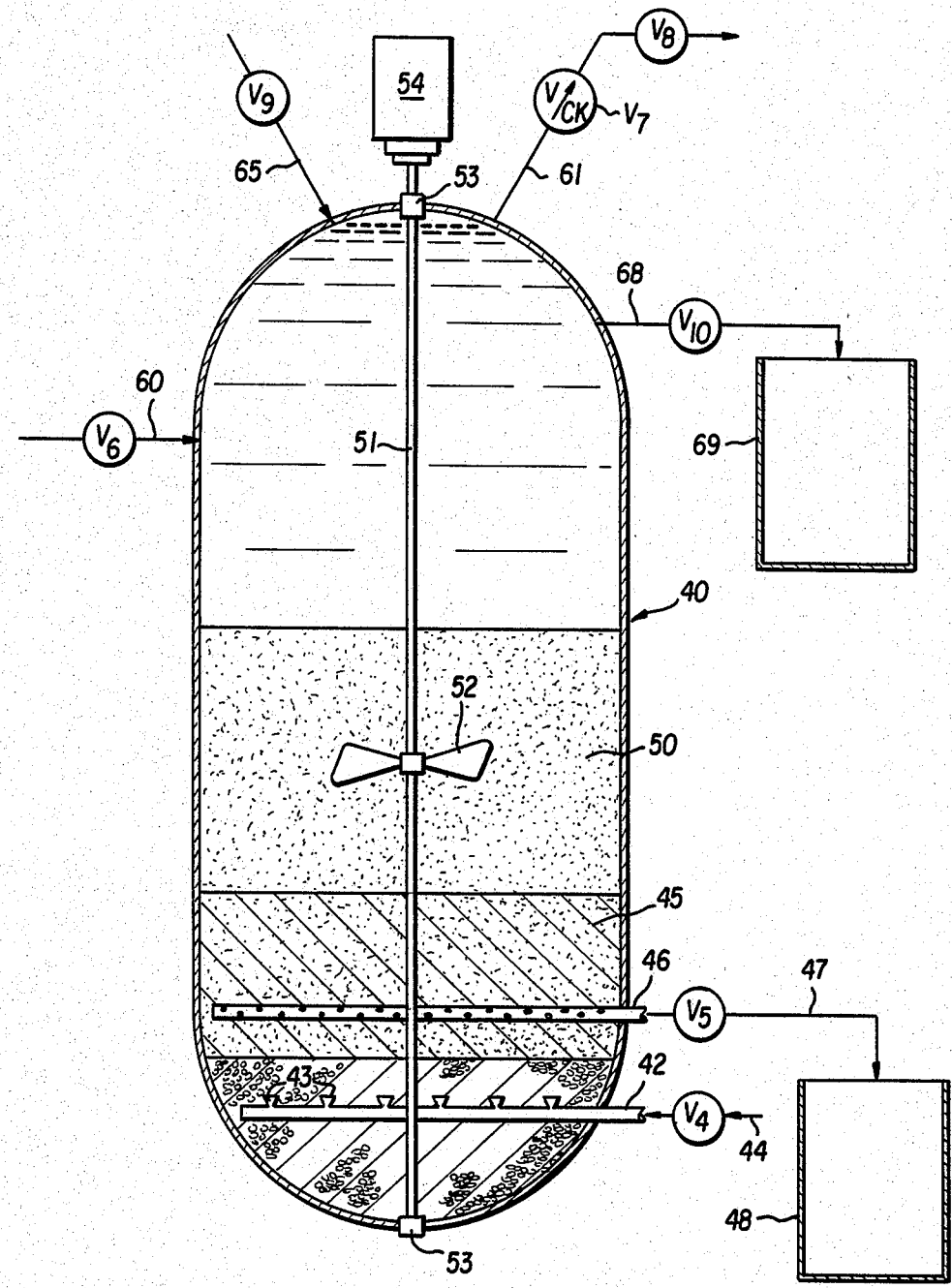

In that embodiment of the invention illustrated in FIG. 2 of the drawings, a different form of apparatus is provided which is particularly adapted for the separation of crude oil or petroleum from water and/or the gases present in the oil as it is pumped from the earth.

In this version of the invention, the receptacle 40 is in the form of a pressure vessel containing a lower bed 41 of coarse stone having embedded therein a backwash conduit 42 with a plurality of upwardly directed nozzles 43 and communicating through a valve V-4 and a conduit 44 with a source of backwash liquid, preferably clean water. Superimposed on the layer 41 of stone is a second layer 45 which comprises a finer grade of stone or coarse sand. Embedded within the layer 45 is a perforate drain 46 for clean liquid or water communicating through a valve V-5 to a clean water conduit 47. Superimposed upon the layer 45 is a bed 50 of filter media as herein disclosed and preferably comprising fruit pit shells or nut shells or mixtures thereof. Projecting vertically through the pressure vessel 40 axially thereof is an agitator shaft 51 carrying an agitator blades 52 located within the confines of the bed 50, the shaft being journaled at axial extremities of the vessel 40 in sealed bearings 53. Surmounting the shaft 51 and serving to rotate the shaft and the agitator blades 52 is a driving motor 54.

The mixture of water and crude oil or petroleum to be separated is introduced into the pressure receptacle 40 through conduit 60 and valve V-6, the liquid being introduced completely filling the pressure vessel 40 for flow downwardly through the bed 50 and the lower level 45 to exit through the drain 46, the valve V-5 and the conduit 47 into the receptacle 48.

The crude oil or petroleum in the oil-water mixture normally contains gases entrained therein, such as methane, hydrogen sulfide, carbon disulfide, or the like. In the event that such gases evolve during the separation of the oil from the mixture, a check valve V-7 is supplied at the upper extremity of the pressure tank 40, this valve being installed in a vent conduit 61 with a second openable and closeable valve V-8 being installed in series with the check valve. This valve V-7 is of the type through which gas, but not liquid, can flow.

It also is necessary, in some instances, that the crude oil or petroleum not be exposed to oxygen or the ambient atmosphere which contains oxygen, since the oil contains iron and sulfur compounds which tend to precipitate out if exposed to oxygen. This condition not only dictates the use of a closed vessel 40, but it also requires a facility for providing a non-oxidizing atmosphere internally of the pressure tank 40, and such atmosphere can be provided by means of a conduit 65 connected to a source of non-oxidizing gas, such as nitrogen, and a valve V-9 in the conduit 65 for controlling the gas flow.

The vessel 40 is provided with an oil drain line 68 located adjacent to the upper regions of the vessel and communicating through a valve V-10 with an oil receptacle 69.

In the operation of the apparatus of FIG. 2 to carry out the method of the present invention, the crude oil or petroleum and water mixture is introduced through line 60 and the open valve V-6 to completely fill the receptacle 40. The valve V-8 also is open at this time, so that any gases evolved from the mixture will be vented through the check valve V-7 without permitting the flow of liquid through the line 61 and without allowing the entry of atmospheric air.

The body of liquid over the bed 50 then flows downwardly through the bed 50 where the oil is coagulated and retained as hereinbefore disclosed, with the water effluent flowing through the drain 46, the open valve V-5 and the line 47 into the receptacle 48. During the introduction of the oil-water mixture and the flow of the mixture through the bed, at least some of the gas dissolved in the oil will be evolved to pass upwardly through the bed. This gas will be vented from the tank through the valve V-7.

As above explained, the pressure drop across bed 50 increases as coagulation proceeds, and as the collection of oil in the bed 50 increases. This pressure drop can be measured in any number of ways, for example by a pressure probe into the receptacle space above the bed 50, by the pressure required to introduce the mixture through the line 60, by the amount of liquid flowing through the drain line 47, or the like.

When the pressure drop exceeds a predetermined maximum desired value, the valves V-6 and V-5 are closed, the agitator motor 54 is actuated, and the bed is expanded, as heretofore explained. If desired, gas under pressure can be introduced through the line 65 by opening the valve V-9 prior to closing of valve V-5 to drain liquid from the upper portions of the casing 40. The gas which is introduced under pressure may be an inert gas, such as nitrogen, in the event that exposure of the mixture to oxygen would be harmful. Alternatively, the valve V-5 can be left open after closure of the valve V-6 to allow the level of liquid above the bed 40 to drop, with the vessel merely being vented to the air, in the event that atmospheric air is not harmful to the vessel content.

Preferably, the level inside the vessel 40 is lowered to below the level of the drain line 68 prior to expansion of the bed and the release of the oil which has been previously coagulated in the bed. This may not be required in the event that the amount of oil accumulating in the bed is so great as to extend from the top of vessel down to the level of the drain line 68.

Assuming that the level of the liquid was initially dropped below the level of the drain line 68, the oil, being lighter than the water of the remaining, non-separated oil-water mixture or the bed particles rises gravitationally within the vessel to collect on top of the body of liquid remaining in the vessel.

Next, the valve V-4 is opened and backwash liquid is introduced through the line 42 to raise the level of the liquid in the vessel, so that the oil flows outwardly through the drain line 68 into the receptacle 69 when the valve V-10 is opened.

Alternatively, as hereinbefore discussed, backwash liquid can be introduced into the vessel during agitation and expansion of the bed. Preferably, the valve V-8 is closed at any time the valve V-9 is open to prevent the mere venting of pressured gas introduced through the line 65.

Once the oil has been removed through the line 68 and into the receptacle 69, the valves V-10 and V-4 are closed, and the valve V-5 is opened as is valve V-6, to reinstitute separating operation of the apparatus.

What is claimed is:

1. In a method of separating an oil-water mixture, the steps of entraining a gas into the oil-water mixture, flowing the mixture with the entrained gas through a bed of individual, naturally occurring media particles of fruit pit shells or nut shells of a size ranging from about 20 mesh to about 60 mesh and having a water wetting-to-oil wetting ratio of at least about three, agglomerating and entrapping the oil in interstices of the bed, and recovering from the bed water which is substantially free of oil.

* * * * *